US009211966B2

(12) United States Patent
Broad

(10) Patent No.: US 9,211,966 B2
(45) Date of Patent: Dec. 15, 2015

(54) PRESSURE LABEL APPLICATOR

(75) Inventor: Gavin John Broad, Liberty, OH (US)

(73) Assignee: The Procter & Gamble Company, Cincinnati, OH (US)

(*) Notice: Subject to any disclaimer, the term of this patent is extended or adjusted under 35 U.S.C. 154(b) by 871 days.

(21) Appl. No.: 12/842,072

(22) Filed: Jul. 23, 2010

(65) Prior Publication Data

US 2011/0067809 A1 Mar. 24, 2011

Related U.S. Application Data

(60) Provisional application No. 61/227,957, filed on Jul. 23, 2009.

(51) Int. Cl.

| | |
|---|---|
| ***B29C 65/00*** | (2006.01) |
| ***B32B 37/00*** | (2006.01) |
| ***B32B 38/10*** | (2006.01) |
| ***B31B 1/60*** | (2006.01) |
| ***B65C 9/30*** | (2006.01) |
| ***B65C 9/20*** | (2006.01) |
| ***B65C 9/08*** | (2006.01) |
| ***B65C 1/00*** | (2006.01) |
| ***B65C 9/26*** | (2006.01) |
| ***B65C 9/18*** | (2006.01) |
| ***B65C 9/06*** | (2006.01) |
| ***B65C 9/02*** | (2006.01) |
| ***B65C 9/00*** | (2006.01) |
| ***B65C 3/00*** | (2006.01) |

(52) U.S. Cl.

CPC ... *B65C 9/30* (2013.01); *B65C 1/00* (2013.01); *B65C 3/00* (2013.01); *B65C 9/00* (2013.01); *B65C 9/0006* (2013.01); *B65C 9/02* (2013.01); *B65C 9/06* (2013.01); *B65C 9/08* (2013.01); *B65C 9/18* (2013.01); *B65C 9/1803* (2013.01); *B65C 9/1869* (2013.01); *B65C 9/20* (2013.01); *B65C 9/26* (2013.01)

(58) Field of Classification Search

CPC .... B65C 1/00; B65C 3/00; B65C 2009/0009; B65C 9/00; B65C 9/006; B65C 9/02; B65C 9/06; B65C 9/08; B65C 9/18; B65C 9/1803; B65C 9/20; B65C 9/26; B65C 9/30

USPC .................................... 156/60, 152, 247, 249

See application file for complete search history.

(56) References Cited

U.S. PATENT DOCUMENTS

| | | | | |
|---|---|---|---|---|
| 4,585,505 | A | 4/1986 | Matsuguchi | |
| 4,832,783 | A * | 5/1989 | Nechay et al. | 156/448 |
| 4,840,694 | A | 6/1989 | Brookman et al. | |
| 5,188,696 | A | 2/1993 | Good, Jr. | |
| 5,248,355 | A * | 9/1993 | Olsen | 156/64 |
| 5,250,129 | A | 10/1993 | Twele | |

(Continued)

FOREIGN PATENT DOCUMENTS

| | | |
|---|---|---|
| FR | 2061325 | 6/1971 |

OTHER PUBLICATIONS

International Search Report and Written Opinion from the International Searching Authority, mailed on Jul. 15, 2011, International Application No. PCT/US2010/042847, 13 pages.

*Primary Examiner* — Michael N Orlando
*Assistant Examiner* — Matthew Hoover
(74) *Attorney, Agent, or Firm* — Gary J. Foose

(57) ABSTRACT

An improved pressure label applicator provides increased speed, quality, and/or reliability in the labeling of containers.

10 Claims, 3 Drawing Sheets

(56) References Cited

U.S. PATENT DOCUMENTS

| | | | | |
|---|---|---|---|---|
| 5,306,375 | A | 4/1994 | Leonard | |
| 5,679,209 | A | 10/1997 | Hinton et al. | |
| 5,902,449 | A | 5/1999 | Moore | |
| 6,083,342 | A | 7/2000 | Frey | |
| 6,230,780 | B1 | 5/2001 | Rietheimer | |
| 6,896,022 | B2 * | 5/2005 | Galles et al. | 156/364 |
| 2004/0226650 | A1 | 11/2004 | Galles et al. | |
| 2007/0209753 | A1 * | 9/2007 | Gonzalez et al. | 156/212 |

* cited by examiner

PRESSURE LABEL APPLICATOR

CROSS REFERENCE TO RELATED APPLICATION

This application claims the benefit of U.S. Provisional Application Ser. No. 61/227,957, filed Jul. 23, 2009.

FIELD OF THE INVENTION

The present invention is directed to an apparatus, and methods of using the same, for labeling containers with a pressure label.

BACKGROUND OF THE INVENTION

Labeling containers with a pressure label is well known. See e.g., U.S. Pat. No. 5,306,375. However, there is a continuing need to apply pressure labels at high speed operations that minimizes egress air entrapment that may occur during the label process (thereby minimizing undesirable label wrinkling). There is also a need to perform such operations on containers that may not have a perfectly cylindrical surface. Such a process would allow greater bottle design flexibility.

See also e.g., U.S. Pat. Nos. 4,585,505; 5,248,355; 5,250,129; 5,306,375; and 6,083,342.

SUMMARY OF THE INVENTION

The present invention attempts to address these and other needs by providing, in one aspect of the invention, an apparatus useful in pressure labeling containers. The apparatus comprises an applicator. The applicator, in turn, comprises a pressure label applicator roller and a peel knife. The peel knife comprises a knife edge capable of peeling a pressure label from its pressure label web. The pressure label applicator roller is juxtaposed with the peel knife, and the pressure label applicator roller is capable of applying the pressure label peeled by the knife edge to a surface of a container to be labeled. Lastly, the apparatus also comprises a servo motor functionally attached to the applicator capable of moving the applicator relative to the surface of the container to be labeled.

A second aspect of the invention provides for a method of labeling a container with a pressure label. One step is directed to unwinding a pressure transfer label from a pressure transfer label roll to an applicator. The pressure transfer label comprises a pressure label releasably affixed to a pressure label web. The applicator comprises a pressure label applicator roller and a peel knife. The peel knife comprises a knife edge. The pressure label applicator roller is juxtaposed with the knife edge. Another step is directed to conveying the container to be labeled to the applicator. Another step is directed to moving the applicator to the conveyed container to frictionally engage the pressure label applicator roller against the container. Another step is directed to peeling the releasable affixed pressure label with the knife edge to provide a released pressure label and the pressure transfer web. Another step is directed to rolling the released pressure label with the applicator roller to the surface of the container while the pressure label applicator roller is frictionally engaged against the container to provide a labeled container. Lastly, the method may include the optional step of conveying the labeled container from the applicator (so a second container may be labeled).

A third aspect of the invention provides for a consumer product comprising a labeled container, wherein the labeled container is made according to the method or apparatus previously described.

DETAILED DESCRIPTION OF THE INVENTION

Pressure Transfer Labeling

Figure 1:
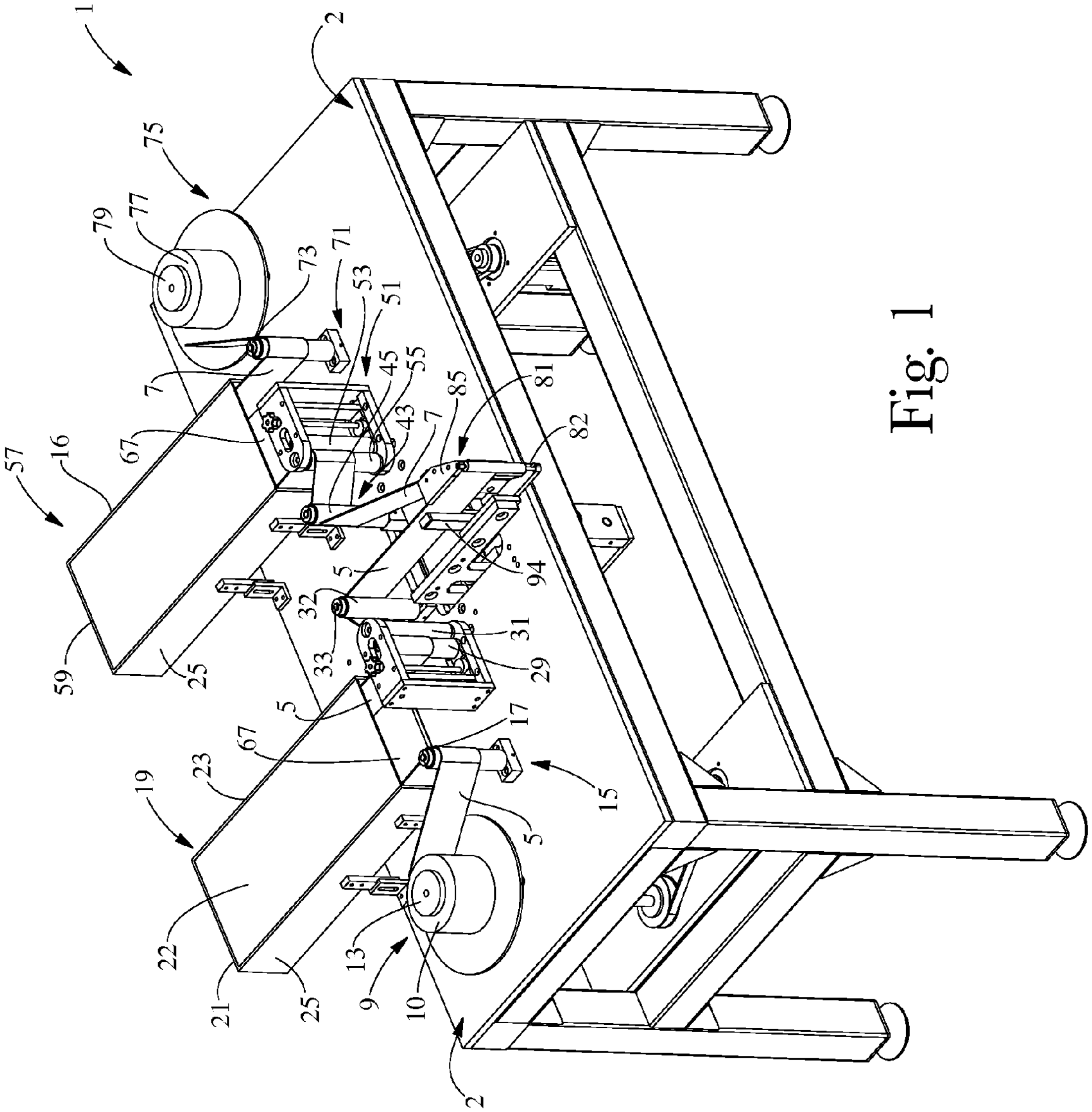
FIG. 1 is a perspective view of an apparatus of the present invention.

Turning to FIG. 1, one aspect of the invention provides for an apparatus (1) for applying a pressure transfer label (5) to a container (not shown). In one embodiment, the apparatus (1) may be configured to apply heat labels (not shown) in one direction and be configured to apply pressure labels in the other direction. The term "container" is used herein in the broadest scope to include any bottle, vessel, box, or the like including a breadth of sizes. Containers are typically comprised of plastic or paper or combination thereof. In one embodiment, the container is capable of containing a consumer product (e.g., laundry detergent or fabric softener). Containers, by way of example, may hold from 100 ml to about 10 liters, alternatively from 200 ml to about 5 liters, of consumer product. The consumer product may be liquid, solid, semi-liquid, semi-solid, granular, semi-granular, or combinations thereof. Containers are typically (but not necessarily) empty, i.e. devoid of consumer product, when conveyed through the labeling processes. In such cases, air may be pumped into the container to build pressure inside the container to provide container rigidity for better labeling results.

First Winder

A first winder (9) unwinds a pressure transfer label (5). The first winder may be center driven or may be surface driven. A pressure transfer label (5) comprises a pressure label (6) releasably affixed to a pressure label web (7). The pressure transfer labels (5) may be discrete or may be non-discrete. It is the pressure transfer label (5) of the pressure transfer label (5) that is ultimately placed on the container (89). The pressure label web (7) is typically wound at the end of the labeling process (e.g., by a second winder (75)). Pressure transfer labels (5) are commercially available and are typically provided on a pressure transfer label roll (10). Non-limiting examples of commercial suppliers of pressure transfer labels (5) include Graphic Packaging International, Inc., Cincinnati, Ohio, and Multi-Color Corporation, Sharonville, Ohio.

The first winder (9) comprises a first servo motor driven spindle (13) that a pressure transfer label roll (10) is functionally attached onto. The first winder (9) may also comprise a first servo motor (not shown) that is operably connected to the spindle of the first servo motor driven spindle (13), wherein the first servo motor is capable of providing rotational torque and/or rotational speed to the spindle of the first servo motor driven spindle (13). The first servo motor applies tension as to control the speed at which the pressure transfer label (5) is unwound from its roll (10) thereby controlling the speed at which the pressure transfer label (5) is feed downstream into the apparatus (1)/labeling process. Of course, in other embodiments of the invention, the tension may be applied from other points downstream in the labeling process.

The first servo motor (of the first servo motor driven spindle (13)) may also be linked to a central program logic controller ("PLC") (not shown) that coordinates data from various points along the components of the apparatus (1) to control inter alia the speed (and direction) of the labeling process. In other embodiments, a constant speed surface drive may be used.

The decreasing diameter of attached pressure transfer label roll (10) during the labeling process may need to be accounted for by adjusting the speed and/or torque of the first servo motor. The PLC may be used to adjust this speed and/or torque.

PLC hardware may be obtained from Rockwell Automation, Milwaukee, Wis. Relevant hardware products may include 1756 ControlLogix PLC, including: Power Supply (1756-PB72), Processor (1756-L61/B), Ethernet Bridge (1756-ENBT), SERCOS Motion Module (1756 M08SE), Digital Input Module (1756-IB16), Digital Output Module (1756-OB16E), and Analog Input Module (1756-IF8).

PLC software may also be obtained from Rockwell Automation. Relevant software products may include: RSLogix 5000 (v 16.03.00), FactoryTalk View Studio ME (v 5.00.00), FactoryTalk View ME Station, RSLinx Classic (v 2.52.00.17).

Drive information, i.e., electrical control of selected motors of the apparatus, may yet also be obtained from Rockwell Automation. Relevant products may include Kinetix 6000 Multi-axis Servo Drives, including: Integrated Axis Module (2094-BC07-M05-S), and Axis Module (2094-BM02-S).

A non-limiting example of a servo motor includes Allen Bradley MPL 330 Servo Motors coupled with an Alpha in line SP075 gear box.

First Idler

The apparatus (1) may comprise a first idler (15) preferably comprising a roller, more preferably a first low inertia roller (17). The first idler (15) guides unwound pressure transfer label (5) entering into a first vacuum box (19). As the diameter of the attached pressure transfer label roll (10) decreases, the angle at which the pressure transfer label (5) exits the first winder (9) changes. The first idler (15) provides a constant feed angle (e.g., about 1-2 degrees) of the pressure transfer label (5) into the first vacuum box (19).

The first low inertia roller (17) is comprised of a carbon fiber hub affixed to an axel (not shown) and wherein the hub may radially rotate around the axel wherein the axel is perpendicular relative to the top surface (2) of the apparatus (1). The carbon fiber hub rotates around the axel on open race ball bearings (not shown) held inside a carbon fiber shell (not shown). Such bearings and a shell are each available from McMaster Carr 6100, Atlanta, Ga.

In one embodiment, the first low inertia roller (17) comprises an overall about 3.8 cm diameter roller that is preferably substantially comprised of materials (such as carbon fiber) to reduce the inertia of the first idler (15). Without wishing to be bound by theory, a low inertia roller typically provides better performance, as compared to a higher inertia roller, when the pressure transfer label (5)/pressure label web (7) is abruptly stopped and started during the labeling process. In another embodiment, the height (i.e., perpendicular to the top surface of apparatus (2)) of the first low inertia roller comprises about 18 centimeters (cm) as measured from the top surface (2) of the apparatus (1). Non-limiting examples of commercially available low inertia rollers include Double E Company, LLC, West Bridgewater, Mass. The height of the rollers of the present invention will depend upon, at least in part, on the width of the pressure transfer label (5).

Although the term "low inertia roller" is used throughout the specification, one skilled in the art will appreciate that the invention is not limited to those rollers with "low inertia," but rather those rollers with lower inertia are preferred.

First Vacuum Box

The apparatus (1) comprises a first vacuum box (19) vacuuming the pressure transfer label (5) contained therein and received from the first idler (15) (or other such upstream component(s)).

Generally speaking (and without limitation), the "vacuum box" (19, 57) is not limited to a six sided rectangular box (as shown in FIG. 1), but rather any container that is capable of containing at a least a portion of a continuous pressure transfer label (5)/pressure label web (7) and a vacuum that may be applied to at least a portion of the label (3) contained in the vacuum box (19, 57). In one embodiment, the vacuum box (19, 57) may be of a parallepiped, spherical, conical, or cylindrical shape, and the like. The pressure transfer label (5) (or pressure label web (7)) may enter or exit into the vacuum box (19, 57) through an open side or a slot, hole, etc., of the vacuum box (19, 57). The vacuum may be created in the vacuum box (19, 57) by creating a vacuum through an open side or slot, hole, etc. (not shown) of the vacuum box (19, 57).

In one embodiment, the vacuum box (19, 57) is six sided rectangle, with walls on five of the six sides, wherein at a least a portion of the pressure transfer label (5) (or pressure label web (7)) enters/exists through one side (of the six sides) that is open (i.e., one side does not have a wall thereby exposing the interior of the vacuum box (19, 57)). A vacuum hose (attached to a vacuum pump that is motor driven providing a vacuum, preferably a constant vacuum) is attached to another side of the six sided vacuum box (preferably opposite the side the label (5) or web (7) that enters/exits the vacuum box (19, 57)) to create the vacuum pressure (not shown). The five walls of the vacuum box may be made from PLEXIGLAS or clear plastic. A typical vacuum range in a vacuum box (19, 57) is about 2 to about 6 inches of water, alternatively from about 0.5 kPa to about 1.5 kPa.

Referencing FIG. 1, the pressure label web (7) downstream to the first vacuum box (19) in labeling process is subject to dynamic motion (e.g., linear oscillating motion of an applicator (81) applying labels (5) to containers, and/or the indexing the pressure transfer label (5)). The first vacuum box (19) disengages this motion of the downstream components/processes from the upstream unwinding step. In other words, the first vacuum box (19) allows the unwinding process to be constant versus indexed. An indexed unwinding step would prove challenging when the attached pressure transfer label roll (10) has a high polar moment of inertia (e.g., given a large roll). "Indexed unwinding" means the pressure transfer label (5) moves forward, then stops, then moves backwards, and then forward again; or the pressure label web (7) moves forward, then stops, then moves forward again; or combinations thereof.

Without wishing to be bound by theory, it is believed the use of one, two, or more of the vacuum boxes (e.g., 19, 57) described herein is what allows the labeling speed to be higher than many described in the art and/or allow the speed of the labeling process to be modified (e.g., start, stopped, increased, decreased). Generally, and without wishing to be bound by theory, the vacuum box(es) (19, 57) lower the polar moment inertia characterized by high speed labeling thereby decreasing stress during the acceleration/decelerations of the dynamic motion of labeling.

The vacuum boxes (19, 57) of the present invention may each comprise a vacuum means (one or more vacuums vacuuming the interior of one or more of the vacuum boxes) to contain the pressure transfer label (5) or pressure label web (7) in a catenary configuration (with the "bottom" of the catenary typically nearest the vacuum opening to the vacuum means). The term "catenary configuration" means broadly a loop, festoon, curve, or the like,—shape of pressure transfer label (5) or pressure label web (7) as a result of the label (5) or web (7) being vacuumed toward the vacuum opening (not shown) (and the vacuum provided by the vacuuming means). In a preferred embodiment, the vacuum opening of the vacuum box (19, 57) is opposite the side the pressure transfer label (5) or pressure label web (7) enters/exits the vacuum box (19, 57) (as shown in FIG. 1). The planar area of the side that the pressure transfer label (5) or pressure label web (7) enters/exists the vacuum box (19, 57) is typically much large than the planar area of the vacuum opening (20), (69), comprising a ratio of about 3:1, 4:1; 5:1; 6:1; 7:1; 8:1, or the like, respectively.

The first vacuum box (19) may comprise five walls to form an open ended container or box. The first vacuum box (19) may comprises a first back wall (21), a first side wall (23), and a second side wall (25); wherein the first and second side walls (23, 25) are about parallel to each other; and wherein the first and second side walls (23, 25) are about perpendicular to the first back wall (21). The first back wall (21) of the first vacuum box (19) may comprise a first vacuum opening (not shown) where a vacuum hose is attached (not shown) to create a vacuum by a vacuum motor to suction the pressure transfer label (3) toward the first back wall (21). A non-limiting example of a vacuum motor may include a regenerative blower Model R2 Gast Manufacturing, Inc., Benton Harbor, Mich.

The length (i.e., the longest dimension) of the first back wall (21) is about 26 cm. The length (i.e., the longest dimension) of the first and second side walls (23, 25) is about 62 cm. The width of the first back wall (21), first side wall (23), and second side wall (25) are each about 11.5 cm, 11.5 cm, 11.5 cm, respectively. Of course this dimension will depend upon the width of the pressure transfer label (5)/pressure label web (7) (and the need to for said label/web to be contained within the vacuum box (19, 57) and minimize the contained volume inside the vacuum box (19, 57) to maximize the vacuum created by the vacuuming means).

The first top wall (22) and first bottom wall (24) contain the pressure transfer label (5)/pressure label web (7) within the first vacuum box (19). The length (i.e., the long dimension) of the first top wall (22) and first bottom wall (24) is 62 cm, whereas the width of the wall is 25 cm. The volume contained inside of the first and second vacuum box (19, 57) is about 18,500 $cm^3$. In one embodiment, the volume contained inside the first vacuum box (19) or second vacuum box (57) is from about 10,000 $cm^3$ to about 30,000 $cm^3$, alternatively from about 5,000 $cm^3$ to about 50,000 $cm^3$.

One skilled in the art will appreciate that there are at least two ways of controlling the tension of the pressure transfer label (5)/pressure label web (7) in a vacuum box (i.e., first vacuum box (19) and second vacuum box (57)): (i) adjusting the vacuum (i.e., increasing or lowering the vacuum as measured by inches of water); and/or (ii) increasing the length (i.e., longest dimension) of the back wall (21) thereby the "catenary configuration" created by said label (5)/web (7) within the vacuum box (19, 57) is larger, which in turn increases the surface area of the label (5)/web (7) that is exposed to the vacuum. The skilled artisan will readily adjust these variables to maximize operating conditions.

One skilled in the art will also appreciate that the pressure transfer label (5)/pressure label web (7) will contact the first side wall (23) and the second side wall (25) of the first vacuum box (19), but preferably not contact the first back wall (21) of the first vacuum box (19), while the apparatus (1) is being operating during the container labeling process. The same can hold true, by analogy, to the second vacuum box (57).

In one embodiment, an ultrasonic sensor (not shown) (e.g., FW Series from Keyance, Cincinnati, Ohio) or other such device, is used to measure and report the distance of the pressure transfer label (5)/pressure label web (7) relative to the first back wall (21) or second back wall (59). In other words, the ultrasonic sensor may dynamically measure the "depth of the catenary configuration" of said label (5)/web (7) contained in the vacuum box (19, 57) to provide this data to the PLC, which in turn may adjust/coordinate, for example, the servo motor of the first servo motor driven spindle (13) or the servo motor of the fourth servo motor driven spindle (79) (and other points of the apparatus (1)), to maintain the optimized depth of the loop. The ultrasonic sensor and/or vacuum may each also be connected to the PLC to be coordinated among the various components of the apparatus (1) and adjusted accordingly. In one embodiment, during the labeling operation, the closest distance measured from the surface of the pressure transfer label (5)/pressure label web (7) relative to the surface of the back wall (21, 59) facing the label (5)/web (7) is from about 1 cm to about 40 cm, alternatively from 3 cm to about 30 cm. In yet another embodiment, at least a portion of the pressure transfer label (5)/pressure label web (7) contained within the vacuum box (19, 57) has a defined length (during the labeling operation). This length may comprise from about 50 cm to about 250 cm, alternatively from about 100 cm to about 200 cm.

In one embodiment, the entry and exit of the pressure transfer label (5) to and from the first vacuum box (19) is adjusted (e.g., by the placement of a first idler (15) and a first nip (27) as to have the pressure transfer label (5) minimize contact with the first and second side walls (23, 25) of the first vacuum box (19). In such an embodiment, the friction against the pressure transfer label (5) in the first vacuum box (19) is ideally minimized.

First Nip

The apparatus (1) comprises a first nip (27), having a second roller (29) (preferably a low inertia roller) and a second servo motor driven roller (31) with the pressure transfer label (5) therebetween, that tensions the pressure transfer label (5) downstream from itself. The two rollers (29, 31) "nip" the pressure transfer label (5) therebetween.

The second roller (29) is analogous to the previously described first roller (17).

The servo motor (not shown) of the second servo motor driven roller (31) is analogous to the motor previously described first servo motor driven spindle (13) in that the second servo is also similarly linked to the PLC (not shown). The PLC may be used to adjust the speed and/or torque of the second servo motor.

However, the second servo motor driven roller (31) comprises a polyurethane outer coated hub. The polyurethane may comprises a 40 Shore A white urethane that is ⅛ inch thick.

The pressure transfer label (5) is thread between the second roller (29) and the roller of the second servo motor driver roller (31) of the first nip (27). The second roller (29) and the roller of the first servo motor driven roller (31) "nip" the pressure transfer label (5) therebetween. An air cylinder (not shown) pushes the second roller (29) against the first servo motor driven roller (31) providing the nip pressure. The second servo driven roller (31) is in a fixed position. A non-limiting example of such an air cylinder comprises NC(D)Q2, Compact Cylinder, Double Acting, Single Rod, from SMC Pneumatics, Indianapolis, Ind. This air cylinder may provide nip pressure in the order of about 20 PSI to about 35 PSI (pounds per square inch), alternatively from a bout 100 kPa to about 275 kPa, alternatively from about 125 kPa to about 250 kPa. In one embodiment, the pressure per length of the nip is from about 35 g/mm to about 75 g/mm, alternatively from about 40 g/mm to about 70 g/mm, alternatively from about 45 g/mm to about 65 g/mm, alternatively from about 50 g/mm to about 60 g/mm, alternatively combinations thereof.

The second servo motor (unlike the first servo motor) of the first nip (27) is operated "forwards," i.e., compelling the pressure transfer label (5) to move forward or upstream in the labeling process, as well as backwards, by the PLC. Without wishing to be bound by theory, having the second servo motor operating backwards (i.e., upstream) provides tension to the pressure transfer label (5) downstream from the first nip (27).

There are three electronic cam profiles determined in the apparatus (1) for the pressure transfer label process. Of course the invention need not be limited to these three. The PLC coordinates these cam profiles. The first, of the three, cam profiles is determined at the first nip (27). A cam profile is typically determined by taking into account parameters such as radius of the container to be labeled, container pitch, speed of the manufacturing lines carrying containers into and out of the labeling process, container curvature, label attachment angle, label dimensions, label pitch, and the like, and combinations thereof. Any one of the three electronic cam profiles also take into consideration the other two electronic cam profiles. Electronic cams control the motion of the servo motors. Besides the first nip (27), electronic cams control the servo motor at the second nip (51) (i.e., the third servo motor driven roller (55)), and the second servo linear motor (not shown) operably connected to the applicator (81).

Second Idler

The apparatus (1) comprises a second idler (33) preferably comprising a third roller (32) (preferably a low inertia roller). The second idler (33) guides pressure transfer label (5) received from the first nip (27). The third roller (32) is like the previously described low inertia rollers.

Applicator

Still referring to FIG. 1, the apparatus (1) comprises an applicator (81) comprising a pressure label applicator roller (82) and a peel knife (85).

Figure 2B:
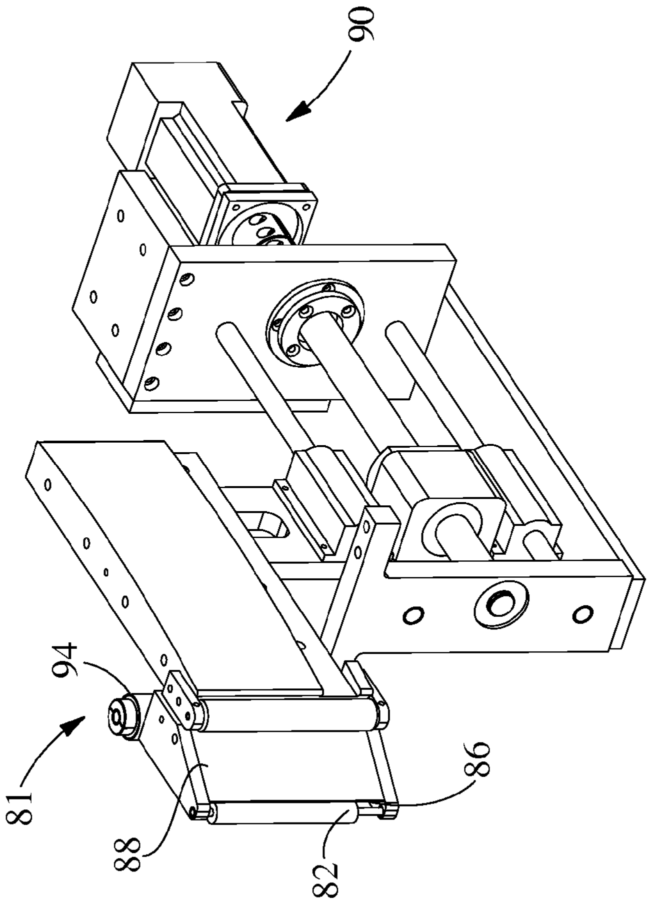
FIG. 2*b* is a facing left view of the applicator of FIG. 2*a*.
Figure 2A:
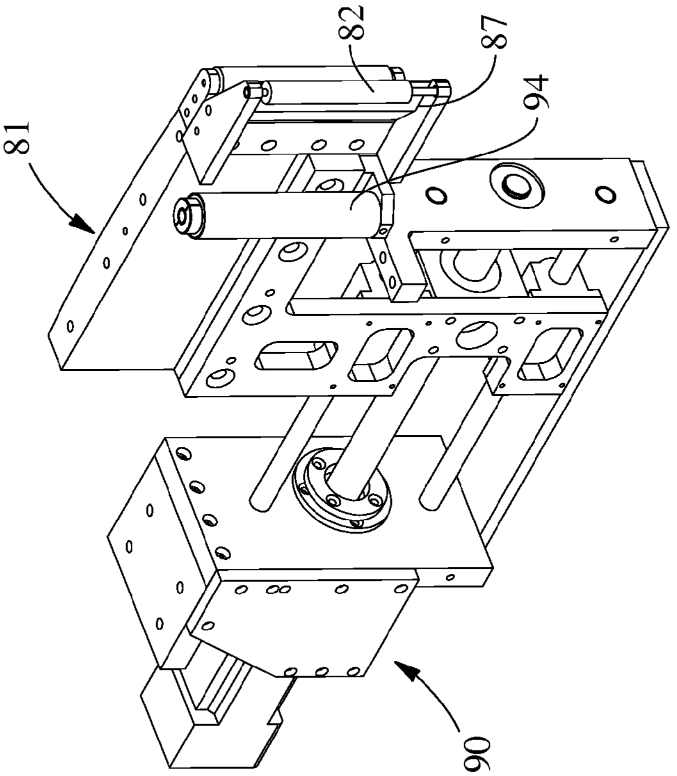
FIG. 2*a* is a facing right view of an applicator of the invention.

Turning to FIGS. 2*a* and 2*b*, FIG. 2*a* is a facing right view of the applicator (81) of FIG. 1, and FIG. 2*b* is a facing left view of the applicator (81) of FIGS. 1 and 2*a*. FIGS. 2*a* and 2*b* the applicator having a guiding idler (94) and pressure label applicator roller (82) are integral (but need not be). The applicator servo motor (90) is functionally attached to the applicator (81) such that the applicator (81) moves relative to the container to be labeled. In one embodiment, the servo motor moves the applicator is a back and back and forth (e.g., reciprocating) motion, alternatively a linear motion, alternatively to apply the pressure label (6) of the pressure transfer label (5) to the container. In yet another embodiment, the servo motor moves the applicator linearly and perpendicularly relative to the path of the conveying of the container to the applicator. In yet another embodiment, the applicator (81) moves in non-perpendicular linear motion relative to the container to be labeled, such an arced or curved, etc. path. The distance traveled by the motion of the applicator (81) depends on inter alia the container geometry and cycle time.

Figure 3:
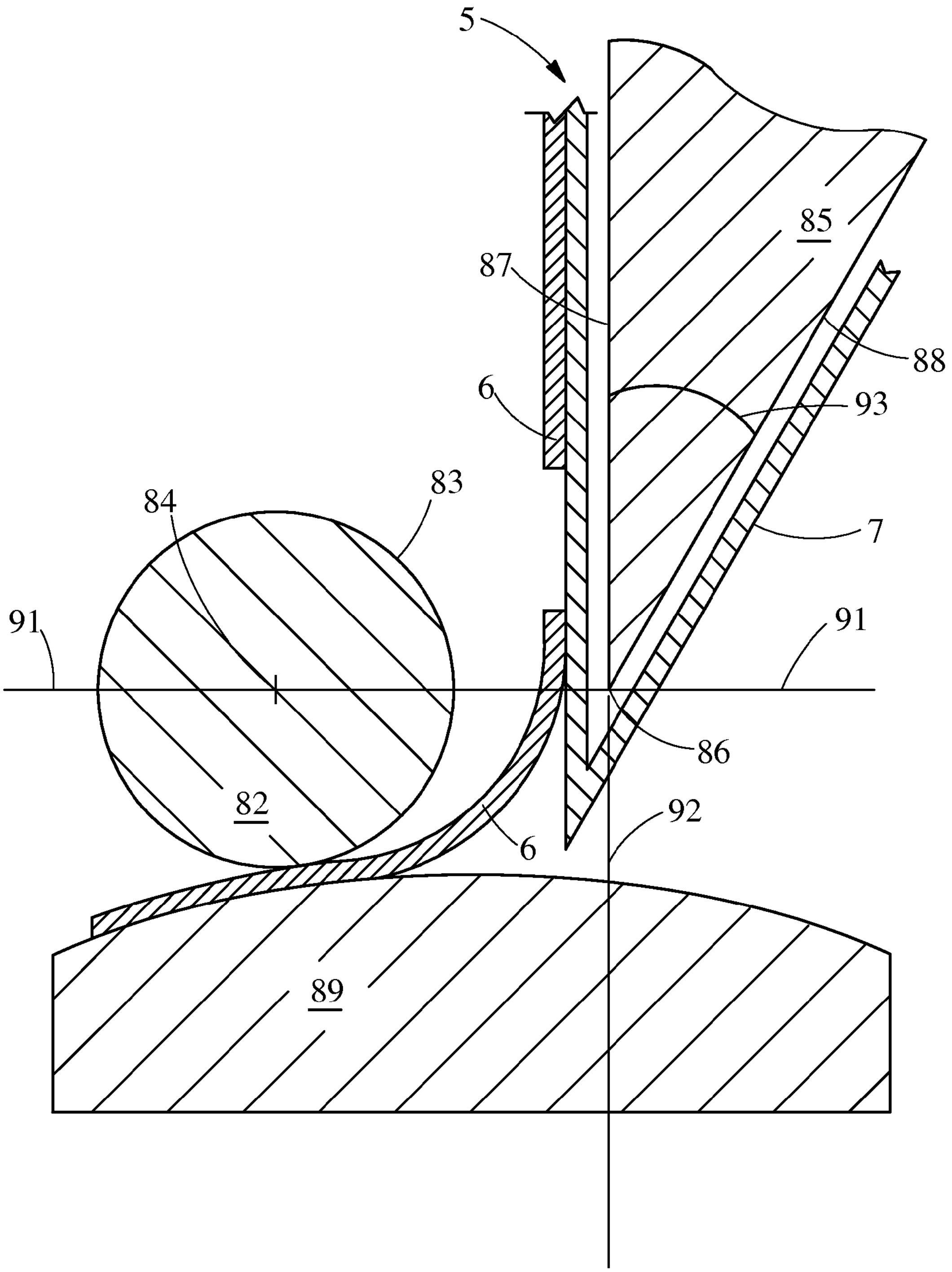
FIG. 3 is a cross sectional top view of the applicator of FIGS. 1, 2*a*, and 2*b* and is not drawn to scale.

FIG. 3 (not drawn to scale) is a cross sectional top view of the applicator (81) of FIGS. 1, 2*a*, and 2*b* and is not drawn to scale. The applicator (81) comprises a pressure label applicator roller (82) and a peel knife (85). The peel knife (85) comprises a knife edge (86) capable of peeling a pressure label (6) from its pressure label web (7) (when the pressure label web (7) is under tension).

The pressure label applicator roller (82) is juxtaposed with the peel knife (85). The pressure label applicator roller (82) is capable of applying the pressure label (6) peeled by the knife edge (86) to a surface of a container (89) to be labeled. The pressure label applicator roller (82) comprises an outermost diameter from about 10 mm to about 40 mm, alternatively from 15 mm to about 35 mm, alternatively from about 20 mm to about 30 mm, alternatively combinations thereof. The pressure label applicator roller (82) comprises an outer surface (83) having a softness rating from about 15 Shore A to about 30 Shore A, alternatively from about 20 Shore A to about 25 Shore A (on the so called "A" scale). One example of such an outer surface is Dow Corning's silicone "HS II RTV-9" as supplied by the Netherland Rubber Company of Cincinnati. In one embodiment, the pressure label applicator roller (82) has an outer thickness of from about 7 mm to about 12 mm, measured from the outer surface (83), of the material having the previously described softness rating (i.e., from 15 Shore A to 30 Shore A etc.).

Still referring to FIG. 3, the applicator (81) comprises a peel knife (85). The peel knife further comprises a leading surface (87) and a trailing surface (88). The knife edge (86) is between the leading surface (87) and the trailing surface (88). The leading surface (87) and the trailing surface (88) for an angle theta (93). The sharp deflection of the pressure transfer label (5) around the knife edge (86) causes the pressure label web (7) to peel away from the pressure label (6) thereby exposing the adhesive coated side of the pressure label (6). It is the adhesive coated side of the pressure label (6) that ultimately adheres to the surface of the container. The pressure label applicator roller (82) makes contact with the non-adhesive side of the pressure label (6). In one embodiment, the angle theta (93) comprises an angle from about 15 degrees to about 45 degrees, alternatively from about 20 degrees to about 40 degrees, alternatively from about 25 degrees to about 35 degrees, alternatively combinations thereof.

Still referring to FIG. 3, the pressure label applicator roller (82) is axially rotatable (preferably freely, i.e., non-motor driven) around an axis of rotation (84). The knife edge (86) and the axis of rotation (84) of the pressure label applicator roller (82) define a first plane (91) therebetween. At least a portion of the leading surface (87) defines a second plane (92). In one embodiment, the first plane (91) and second plane (92) are orthogonal to each other. In another embodiment, "the portion of the leading surface nearest the knife edge" means the distance equivalent to the radius (of the most outer edge) of the pressure label applicator roller (82), measured from the knife edge (85). In yet another embodiment the leading surface (87) and/or the trailing surface (88) is planer. The distance between the outer surface (83) of the pressure label applicator roller (82) and the knife edge (86), measured along the first plane (91), is from about 0.25 mm to about 1.75 mm, alternatively from about 0.5 mm to about 1.50 mm, alternatively from about 0.75 mm to about 1.25 mm, alternatively combinations therein.

As to FIG. 3, one aspect of the invention provides for a method of labeling a container (89) with a pressure label (6 not shown) comprising the steps of conveying the container (89) to be labeled to the applicator (81). The conveying may be conducted by a conveyor belt (not shown). The conveyor for the conveying step may convey the container a linear manner or an arced manner or other such manner. An additional step is directed to moving the applicator (81) to the conveyed container (89) to frictionally engage the pressure label applicator roller (82) against the container (89). Another step is directed to peeling the releasable affixed pressure label (6) with the knife edge (86) to provide a released pressure label (6) and the pressure transfer web (7). Another step is directed to rolling the released pressure label (6) with the applicator roller (82) to the surface of the container (89) while the pressure label applicator roller (82) is frictionally engaged against the container (89) to provide a labeled container. The labeled container may be conveyed away from the applicator (81) so the next container to be labeled may be moved into place.

In another embodiment, the containers (89) that are conveyed to the applicator (81) to be labeled are spaced relative close together, for example 0.5 cm to about 10 cm (measured from their closes proximity surface to surface), alternatively 1 cm to about 5 cm, alternatively 0.1 cm to about 2 cm, alternatively combinations thereof. Without wishing to be bound by theory, the combination of the motion of the applicator (81) generated by the applicator servo motor (90) functionally attached thereto, coupled with pressure label applicator roller (82) and its proximity to the knife edge (86), facilitates the labeling of containers that are in closer proximity to each other. Since inter alia the containers are in close proximity, greater container labeling speeds may be achieved thereby providing greater efficiency and productivity in manufacturing and production. In yet another embodiment, the method of the present invention is free of a timing screw or other such container spacing step (before labeling).

A second, of three, electronic cam profiles is generated for the applicator (81). Previously described variables are taken into account in generating this second electronic cam profile. The PLC coordinates the electronic cam profile of the applicator (81).

Containers may be brought to and from the applicator through those means known in the art, including but not limited to by conveyor. The conveyor path may be linear or curved.

Third Idler

The apparatus (1) may comprise a third idler (43) preferably comprising a fourth roller (45) (preferably a low inertia roller). The third idler (43) guides pressure label web (7) received from the trailing surface (88) of the peel knife (85).

The fourth roller (45) is like the previously described third, second, and first low inertia rollers (32, 29, and 17 respectively).

Second Nip

The apparatus (1) comprises a second nip (51) (much like the first nip (27)), having a fifth roller (53) (preferably low inertia roller) and a third servo motor driven roller (55) with the pressure label web (7) or therebetween.

The fifth roller (53) is like the previously described first, second, third, and fourth rollers (17, 29, 32, 45, 53 respectively).

The servo motor (not shown) of the third servo motor driven roller (55) is analogous to the motor previously described first and second servo motor drive rollers (17, 29 respectively) in that the third servo motor is similarly linked to the PLC (not shown). The PLC may be used to adjust the speed and/or torque of the servo motor of the third servo motor driven roller (55).

The third servo motor driven roller (55) comprises a polyurethane outer coated hub like hub of the second servo motor driven spindle (33) as previously described.

The pressure label web (7) is thread between the fifth roller (33) and the roller of the third servo motor driven roller (55). Analogous to the first nip (27), the fifth low inertia roller (33) and the spindle of the third servo motor driven roller (55) “nip” the pressure label web (7) therebetween. An air cylinder (not shown) pushes the fifth roller (53) against the third servo motor driven roller (55) providing nip pressure. The third servo motor driven roller (55) is in a fixed position. Examples of the air cylinder and nip pressures are as previously described in the first nip (27).

The third servo motor (like the second servo motor but unlike the first servo motor) of the second nip (51) is operated “forwards,” i.e., compelling the pressure label web (7) to move forward or upstream in the labeling process, as well as backwards by the PLC. Without wishing to be bound by theory, having the third servo motor operating backwards provides tension to the pressure transfer label (5) and pressure label web (7) upstream from the second nip (51).

The second nip is the third and final of the electronic cam profiles in the apparatus (1). As previously discussed, the PLC coordinates this cam and the other two cams (and the variables previously described).

Second Vacuum Box

The apparatus (1) comprises a second vacuum box (57) vacuuming the pressure label web (7) received from the second nip (51) (or other such upstream component).

During the pressure labeling processes, the pressure label web (7) upstream to the second vacuum box (57) is subject to dynamic movement. The second vacuum box (57) disengages this motion of the upstream components/processes from the downstream pressure label web (7) rewinding step (discussed infra). In other words, the second vacuum box (57) allows the rewinding process to be constant verses an indexed process.

A typical vacuum range would be those previously described for the first vacuum box (19). Similarly the second vacuum box (57) may also comprises a second back wall (59), a third side wall (61), and a fourth side wall (63); wherein the third and fourth side walls (61, 63 respectively) are about parallel to each other; and wherein the third and fourth side walls (61, 63) are about perpendicular to the second back wall (59). The second back wall (59) of the second vacuum box (57) may also comprise a second vacuum opening (not shown) where a vacuum hose is attached (not shown) to suction the pressure label web (7) toward the second back wall (59) (by a vacuum motor). The second top wall (22) and second bottom wall (24) encase the pressure label web (7) within the second vacuum box (57).

The dimensions/specifications of the vacuum motor, and walls (59, 61, 63, 65, 67) of the second vacuum box (57) are those as previously described for the first vacuum box (19). Ways of controlling the tension of the pressure label web (7) of the second vacuum box (57) are essentially the same as described for the pressure transfer label (5) in the first vacuum box (19). Ways of measuring and reporting the distance of the pressure label web (7) of the second vacuum box (57) are essentially the same as described for the pressure transfer label (5) in the first vacuum box (19). Ways of minimizing friction against the pressure label web (7) in the second vacuum box (57) is ideally reduced essentially the same as described for the pressure transfer label (5) in the first vacuum box (19).

Fourth Idler

The apparatus (1) may comprise a fourth idler (71) preferably comprising a sixth roller (73) (preferably a low inertia roller). The fourth idler (71) guides pressure label web (7) exiting from the second vacuum box (57) to a second winder (75)(discussed infra).

The sixth roller (73) is like the previously described first, second, third, fourth, and fifth rollers (17, 29, 32, 45, 53 respectively).

Second Winder

The apparatus (1) may comprise a second winder (75). The second winder (75) winds the pressure label web (7) into a pressure label web roll (77). The second winder (75) comprises a fourth servo motor driven spindle (79) that the pressure label web roll (77) is functionally attached onto. The second winder (75) may also comprise a fourth servo motor (not shown) that is connected to a second spindle of the fourth servo motor driven spindle (79). The fourth servo motor applies tension to the winding of the pressure label web (7) as to control the speed at which the pressure label web (7) is wound into a pressure label roll (77) thereby controlling the speed of pressure label web (7) update in the pressure labeling process.

The fourth servo motor (of the second winder (75)) may also be linked to the PLC that coordinates data from various points along the components of the apparatus (#1 to control inter alia the speed of the labeling process). The increasing diameter of the pressure label web roll (77) may need to be accounted for in the labeling process by adjusting the speed and/or torque of the fourth servo motor. The PLC may be used to adjust this speed and/or torque.

Labeling Speed

In one embodiment, the apparatus labels about 1 to about 350 containers per minute, alternatively from about 50 to about 150 containers per minute, alternatively from about 150 to about 350 container per minute, alternatively from about 250 to about 300 container per minute; alternatively the apparatus labels containers faster than 100 container per minute, alternatively faster than 150 containers per minutes, alternatively faster than 200 containers per minute, alternatively faster than 250 containers per minute, alternatively faster than 300 containers per minute. In yet another embodiment, the apparatus labels containers at a constant speed and/or slows down the container labeling speed without stopping, or even substantially stopping, the labeling process.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus useful in pressure labeling containers comprising:

a) an applicator comprising a pressure label applicator roller and a peel knife, wherein
   (i) the peel knife comprises a knife edge capable of peeling a pressure label from its pressure label web when the web is under tension; and
   (ii) the pressure label applicator roller is juxtaposed with the peel knife, and wherein the pressure label applicator roller is capable of applying the pressure label peeled by the knife edge to a surface of a container to be labeled;

b) a servo motor functionally attached to the applicator capable of moving the applicator relative to the surface of the container to be labeled.

2. The apparatus of claim 1, wherein the pressure label applicator roller comprises an outermost diameter from about 20 to about 30 mm.

3. The apparatus of claim 2, wherein the pressure label applicator roller comprises an outer surface of a material having a softness rating from 20 Shore A to about 25 Shore A, and having an outer thickness of said material from about 7 mm to about 12 mm.

4. The apparatus of claim 1, wherein:

(a) the peel knife further comprises a leading surface and a trailing surface, wherein the knife edge is between the leading surface and the trailing surface;

(b) the pressure label applicator roller is freely axially rotatable around an axis of rotation;

(c) the knife edge and the axis of rotation of the pressure label applicator roller define a first plane therebetween;

(d) at least a portion of the leading surface defines a second plane, and wherein the first plane and second plane are orthogonal to each other.

5. The apparatus of claim 4, wherein the portion of the leading surface nearest the knife edge defines the second plane is the portion nearest the knife edge.

6. The apparatus of claim 1, wherein the leading surface and the trailing surface form an angle theta, wherein the theta angle is from about 10 to about 40 degrees.

7. The apparatus of claim 1, wherein the distance between outer surface of the roller and the knife edge is from about 0.5 mm to about 1.5 mm.

8. The apparatus of claim 4, wherein the distance between the outer surface of the roller and the knife edge along the first plane is from about 0.75 mm to about 1.25 mm.

9. The apparatus of claim 1, wherein the applicator is for moving in a linear motion.

10. The apparatus of claim 1, wherein the applicator is capable of having the outer surface of the pressure label applicator roller frictionally engage the container to be labeled.

* * * * *